RECEIVER TUNABLE OVER V.H.F. AND U.H.F. TELEVISION BANDS

Filed July 8, 1952 4 Sheets-Sheet 1

INVENTOR
SID DEUTSCH
BY Ralph B. Stewart
ATTORNEY

RECEIVER TUNABLE OVER V.H.F. AND U.H.F. TELEVISION BANDS

Filed July 8, 1952 4 Sheets-Sheet 2

INVENTOR
SID DEUTSCH

BY Ralph B. Stewart

ATTORNEY

INVENTOR
SID DEUTSCH
BY Ralph B. Stewart
ATTORNEY

RECEIVER TUNABLE OVER V.H.F. AND U.H.F. TELEVISION BANDS

Filed July 8, 1952 4 Sheets-Sheet 4

INVENTOR
SID DEUTSCH

BY Ralph B. Stewart

ATTORNEY

United States Patent Office 2,771,548

Patented Nov. 20, 1956

2,771,548

RECEIVER TUNABLE OVER V. H. F. AND U. H. F. TELEVISION BANDS

Sid Deutsch, Brooklyn, N. Y., assignor to Polytechnic Research & Development Co., Inc., Brooklyn, N. Y., a corporation of New York Application July 8, 1952, Serial No. 297,706

11 Claims. (Cl. 250—20)

This invention relates to radio wave tuners especially useful in the television band of wavelengths.

A broad object of my invention is to devise a tuner capable of covering a wide range of frequencies in the very high frequency and ultra-high frequency bands. By way of example, a tuner, according to my invention, may be designed to cover the range from 54 megacycles up to 890 megacycles using only one tuning control movable through almost 360 degrees.

My present invention is concerned with improvements in a tuner of the type disclosed in my copending application Serial No. 235,117, filed on July 5, 1951 jointly with Herbert A. Finke. This type of tuner involves two or more tunable lines which are coupled in cascade in a receiving channel. Each tuned line is in the form of a coaxial cable or shielded conductor having a short-circuiting slider which varies the effective length of the line and thereby tunes the line. In the preferred form, the tuned lines are constructed in circular form and the short-circuiting sliders are mounted upon arms which rotate about a common axis. Also, each tuned line is formed with one or more gaps at intermediate points therein and each gap is shunted by a loading loop section to skip or jump a predetermined frequency band within the tuning range.

A specific object of the present invention is to improve the tuned line structure so that a longer line may be accommodated in a given space. This is accomplished by providing a novel arrangement of the loading loop sections to permit the use of overlapping loop sections without inductive interference between them. To this end each tuned line embodying a number of loading loops is formed around a grounded metallic shield plate, some of the loops being arranged on one side of the shield plate while others are arranged on the opposite side of the plate.

In the preferred form of the tuner each tunable line is formed with a gap in the center conductor thereof, thus dividing each line into two linear sections, one covering the high frequency portion of the tuning range and the other covering the low frequency portion of the tuning range. The high frequency sections of the tunable lines are connected in cascade to form the high frequency channel of the receiver, while the low frequency sections of the lines are connected in cascade to form the low frequency channel of the receiver. A single set of short-circuiting sliders serves both channels of the receiver.

Another specific object of the present invention is to design the tuner so that the two channels are fed from a common input and are provided with a common output channel.

Another object is to devise a novel arangement whereby the short-circuiting sliders function automatically to disable one channel when they are operating within the range covered by the other channel.

Still another object of the present invention is to devise a novel broad-band amplifier for use in the receiving channel covering the low-frequency range of the tuner.

My improved tuner is especially useful as a preselector tuner in a superheterodyne receiver employing a local oscillator which also uses a tunable line similar to the tunable lines of the tuner and having its slider operated from a common operating shaft with the sliders of the tuner.

Still another object is to provide individual local oscillators for the two tuner channels and provide for the selective energization of these oscillators by the slider of the tuned oscillator line.

The invention is illustrated in the accompanying drawing, in which Figure 1 is a circuit diagram illustrating the preferred form of the tuner as applied to a radio receiver for receiving waves in the very high and ultra-high frequency bands.

Figures 2 to 10, inclusive, illustrate one physical form of the tuner and oscillator structure suitable for the circuit of Figure 1 and designed to cover television channels 2 to 13 and higher frequencies.

It will be noted that Figures 6 to 9 are shown on a somewhat enlarged scale with reference to Figures 2 to 5.

Figure 1:
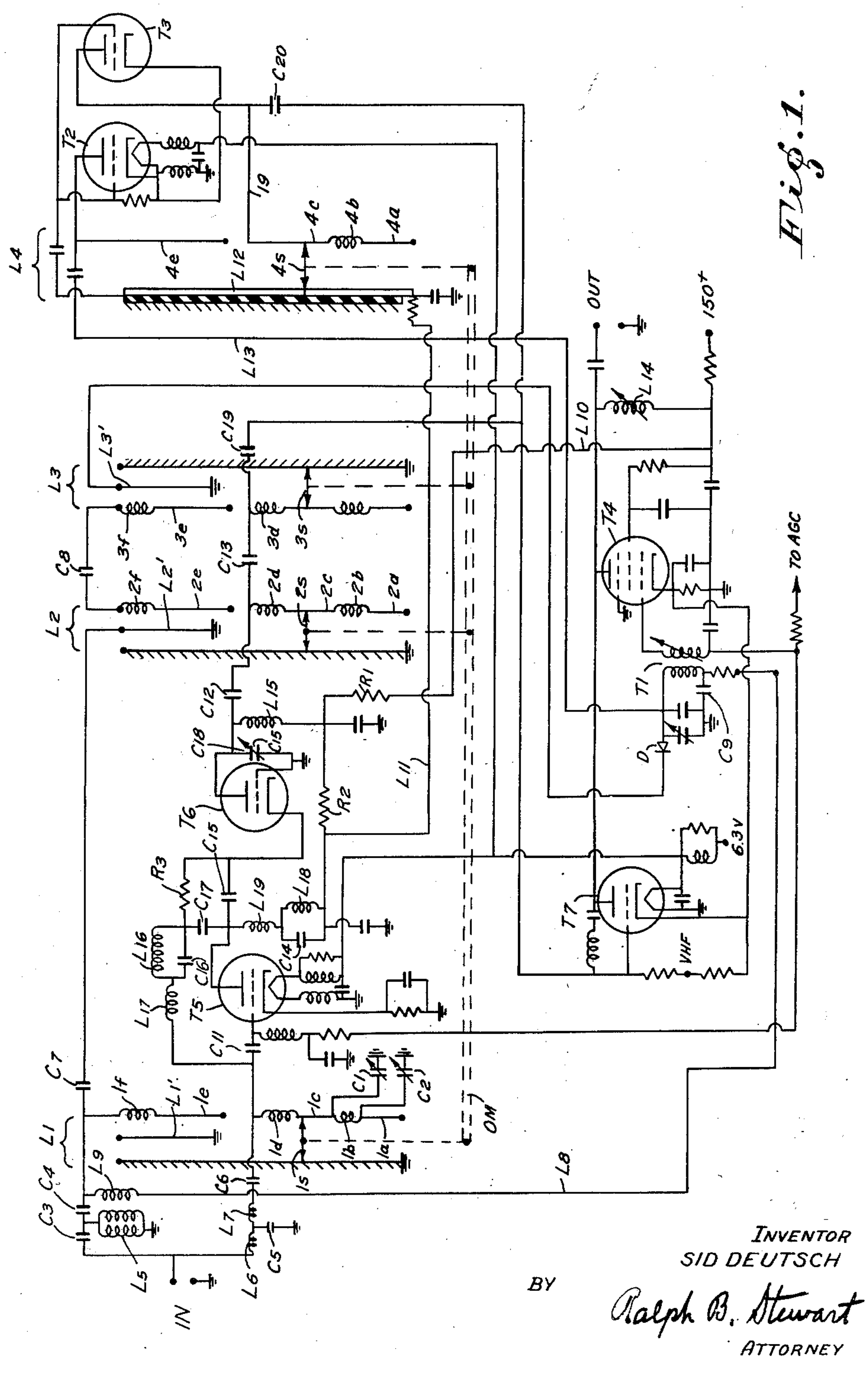

Referring to the drawing, Figure 1 is a circuit diagram illustrating the preselector tuner and local oscillator of a radio receiver of the superheterodyne type, suitable for receiving waves within the very high frequency and ultra-high frequency bands.

The tuner of Figure 1 involves three tunable lines which are coupled in cascade between the receiving antenna and the first detector for selecting the desired frequency within a given tuning range. As already explained, each tuned line is in the form of a coaxial cable or shielded conductor having a slider which varies the effective length of the line and thereby tunes the line. The local oscillator is also provided with a tuned line of similar construction for varying the frequency of the oscillator. The sliders of the tuner lines and the slider of the local oscillator are all ganged for simultaneous operation.

Referring now to Figure 1, the three tuner lines are shown at L1, L2, and L3, and the oscillator line is shown at L4. Each tuner line is formed of two main sections which are insulated from each other, one for the high frequency band of the tuning range and the other for the low frequency band, and each main section may be formed of two or more smaller sections. For example, in the arrangement of Figure 1, the low frequency section of line L1 is formed of four smaller sections 1*a*, 1*b*, 1*c* and 1*d*, and the high frequency section is formed of smaller sections 1*e* and 1*f*, a small gap being provided between sections 1*d* and 1*e*. Line L2 is formed of similar sections 2*a* to 2*f* respectively. The short-circuiting sliders for the four tuned lines are shown at 1s, 2s, 3s, and 4s, respectively. The sliders are connected to a common operating member OM for simultaneous operation throughout the tuning range. Conductor sections 1a, 1c, and 1e of line L1 are arranged to be engaged by the slider 1s as it moves from one end of the line to the other, but conductor sections 1b, 1d and 1f are formed as loops which are curved or bent out of the path of the slider 1s and are arranged to bridge relatively short gaps (greatly exaggerated in Figure 1) between the sections of the conductor which are engaged by the slider 1s. The shielded conductors of lines L2 and L3 are arranged in sections in the same manner as line L1, as will be seen from Figure 1 of the drawing. The tuned line L4 of the oscillator also is divided into sections in the same manner as the tuner lines.

As explained above, the high frequency sections of the tuner lines are isolated from the low frequency sections by a gap formed between the d and e sections of each line. Suitable trimmer condensers, such as C1 and C2 may be connected between the line shield and the ends of each loop section of line L1 for the purpose of obtaining accurate adjustment of the tuner to the desired frequency over the different sections. Similar trimmer condensers may be provided on the other tuner lines for the same purpose.

The free end of the high frequency section of line L1 is connected to an input terminal IN through a filter section formed of two series condensers C3 and C4 and a shunt inductance L5. The high frequency end of the low frequency section of line L1 (the free end of section 1d) also is connected to input terminal IN through a filter section formed of two series inductances L6 and L7 and a shunt condenser C5, and a blocking condenser C6 is connected between the filter section and the tuner line. The filter section C3—C4—L5 is designed to pass very high frequency waves, such as waves in the U. H. F. band, while filter section C5—L6—L7 is designed to pass waves of lower frequency, such as waves in the V. H. F. band, including bands now used for television channels.

The high frequency sections of tuner lines L1, L2 and L3 are provided with coupling lines L1', L2' and L3' arranged in inductive relation with the center conductors in these tuners, but the coupling lines are not engaged by the short-circuiting sliders. One end of each coupling line or loop is grounded. Tuner line L1 is coupled to line L2 by condenser C7 connected between the upper end of line section 1f and the free end of coupling loop L2'. Line L2 is coupled to line L3 by condenser C8 connected between the upper end of line section 2f and line section 3f.

The free end of coupling loop L3' is connected to a crystal detector D, and the path for rectified current is completed from detector D to ground through the following elements: from crystal D through the primary winding of transformer T1, through connection L8, choke-coil L9, through this choke-coil to line L1, through section 1f of line L1 to slider 1s and then to ground, when the slider is operating within the high frequency section of the tuner. Thus, the circuit for crystal D is completed only when the tuner is operating within the high frequency section of the tuning range.

An electron tube T2 is connected to the high frequency section of the oscillator line L4 in a conventional oscillator circuit to provide local oscillations of suitable frequency when the tube is operating within the high frequency section. A second vacuum tube T3 is connected to the low frequency section of the oscillator line L4 in a conventional oscillator circuit for supplying local oscillations when the tuner is operating in the low frequency section.

Operation of the two local oscillators is selectively controlled by the slider 4s on line L4. This is accomplished by supplying the anode currents for the two oscillators through the slider. As shown, anode current is supplied from terminal 150+ through connection L10, through resistors R1 and R2, and through connection L11 to an insulated trackway L12 for the slider 4s in the oscillator line L4. By connecting the anodes of tubes T2 and T3 to the high frequency ends of the two sections of line L4, the slider 4s will supply anode current to tube T3 when operating in the low frequency section of the tuner and will supply anode current to tube T2 when operating within the high frequency section of the tuner. It will be understood that the two oscillators operate at a different frequency from the frequency to which tuner lines L1 to L3 are tuned at any given time to provide a predetermined different frequency in the detector circuit. Tubes T2 and T3 may be separate tubes, or they may constitute separate sections of a double triode, such as type 6J6.

Oscillations from oscillator T2 are supplied through connection L13 to the upper end of the primary of transformer T1 where they are combined with the signal oscillations supplied from tuner line L3 to produce a difference or beat frequency of a predetermined value, such as 44 megacycles. The primary winding of transformer T1 is tuned to the beat-frequency, or intermediate frequency, by condensers connected in shunt to the winding as shown. The lower end of this winding is connected to ground through a blocking condenser C9 of high value. The secondary winding of transformer T1 is also tunable to the intermediate frequency by any suitable means and is connected to the control grid of a suitable electron tube amplifier T4. The anode current of amplifier T4 is supplied from terminal 150+ through a coupling inductance L14 which is variable to tune the output circuit to the intermediate frequency. The anode circuit of amplifier T4 is connected through a blocking condenser C10 to an output terminal OUT which would lead to another stage of intermediate frequency amplifier and eventually to the second detector.

In the low frequency channel of the tuner, a two-stage amplifier is inserted between line L1 and line L2. This amplifier involves electron tubes T5 and T6.

The control grid of tube T5 is connected to the free end of section 1d of line L1 through a blocking condenser C11. The anode of tube T6 is connected to the free end of section 2d of line L2 through a coupling condenser C12, and line L2 is coupled with line L3 by a condenser C13 connecting the free ends of line sections 2d and 3d.

It is desirable to disable the amplifiers in the low frequency channel when the tuner is operating in the high frequency channel, and this is accomplished by a switching operation performed by one of the tuner sliders. In the arrangement shown in the drawing, the anode current path for tube T6 is completed through slider 1s by way of the low frequency section of line L1. The anode current path for this tube extends from terminal 150+ through connection L10, resistor R1, choke coil L15, through tube T6, resistor R3, and inductances L16 and L17 to the upper end of line section 1d. From this point the anode current circuit is completed through the low frequency section of line L1 by way of slider 1s. By this arrangement, the amplifier in the low frequency channel is disabled when the tuner is operating in the high frequency channel.

Where the low frequency channel is to cover the usual television channels 2 to 13, it is desirable to provide broadband operation of the amplifier over channels 2 to 6 (54 to 88 megacycles) and over channels 7 to 13 (174 to 216 megacycles) while operating at reduced gain over the frequencies between channels 6 and 7 (88 to 174 megacycles). This is accomplished by connecting a tuned network from the anode of tube T5 to ground. This network consists of a parallel combination of coil L18 and condenser C14 and a series inductance L19. The anode of tube T5 is also connected to the floating cathode of tube T6 through a blocking condenser C15.

In order to secure the desired broad-band operation, the network C14—L18—L19 must be designed according to the following conditions:

*a.* At the geometric mean frequency between 54 and 88 Mc. (69 Mc.), the network should resonate with the stray capacitance of the tube and wiring. At 69 Mc., the condenser C14 is essentially an open circuit, and the two coils L18 and L19 resonate with stray capacitance.

*b.* At the geometric mean frequency between 174 and 216 Mc. (194 Mc.), the network should again resonate with the stray capacitance, but at this frequency (194 Mc.) condenser C14 is essentially a short-circuit, and only coil L19 resonates with the stray capacitance.

*c.* At the geometric mean frequency between 88 and 174 Mc. (124 Mc.), the coil L19 should series resonate with the condenser C14, so that the output at this frequency is a minimum.

The amplifier also requires a neutralizing circuit connected between the grid and plate of the first stage T5, and this neutralizing circuit is in the form of a network consisting of a parallel combination of coil L16 and condenser C16 and series inductance L17. This network is designed according to the same principles as the network C14—L18—L19. It will be found that condenser C14 and condenser C16 will have different values, because the neutralizing circuit must resonate with grid-to-plate capacitance which is much smaller than the stray capacitance of the coupling network between the two tubes. In one embodiment using such a tube, condenser C14 has a capacitance value of 27 micro-micro-farads, while condenser C16 has a value of 3.3 micro-micro-farads.

A blocking condenser C17 provides a radio frequency connection between the anode of tube T5 and the parallel combination C16—L16. Resistor R3 provides biasing potential for the cathode tube T6. The grid of tube T6 is grounded, and a condenser C18 is connected between the anode and the ground. Anode current for tube T5 is supplied from terminal 150 through connection L10 and through elements R1, R2, L18 and L19.

The free end of section 3*d* in the low frequency section of line L3 is connected through a blocking condenser C19 to the grid of an electron tube detector T7 which may be a separate tube or may be one section of a single tube of the type 6X8, the other section of which would comprise tube T4. The anode of tube T7 is connected to the anode of tube T4 which is connected to the output terminal OUT through the blocking condenser C10. Oscillations from local oscillator T3 are applied through a blocking condenser C20 to the grid of detector T7 when the slider contact 4*s* is operated in the low frequency channel of the tuner. At this time, the amplifier T4 does not enter into the operation.

Control grids of amplifiers T4 and T5 are supplied with gain-control potentials from the usual gain-control circuit marked AGC which is connected to the video amplifier section of the receiver.

Figure 2:
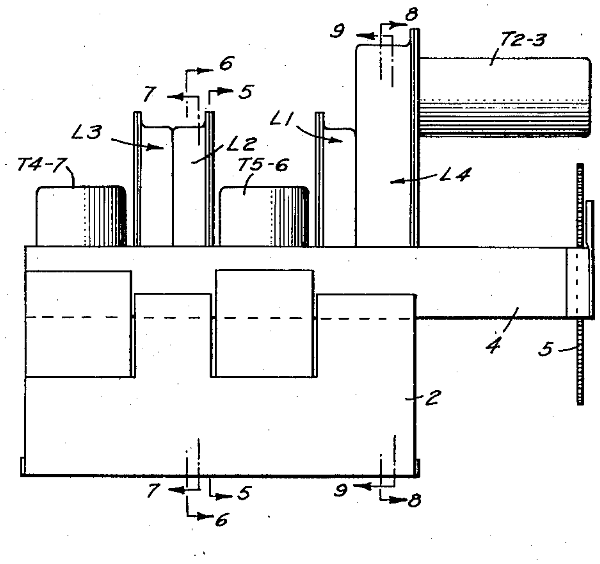
Figure 2 is a side elevational view of the tuner-oscillator assembly.
Figure 3:
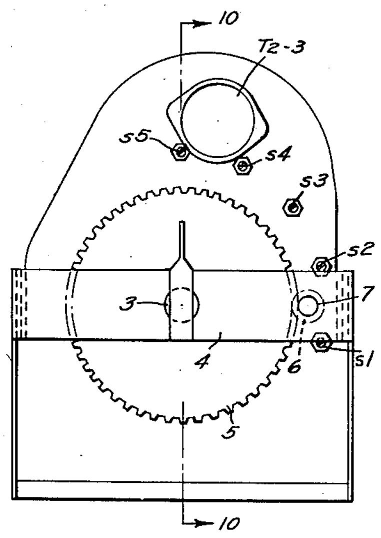
Figure 3 is a front elevational view of Figure 2.
Figures 4, 5:
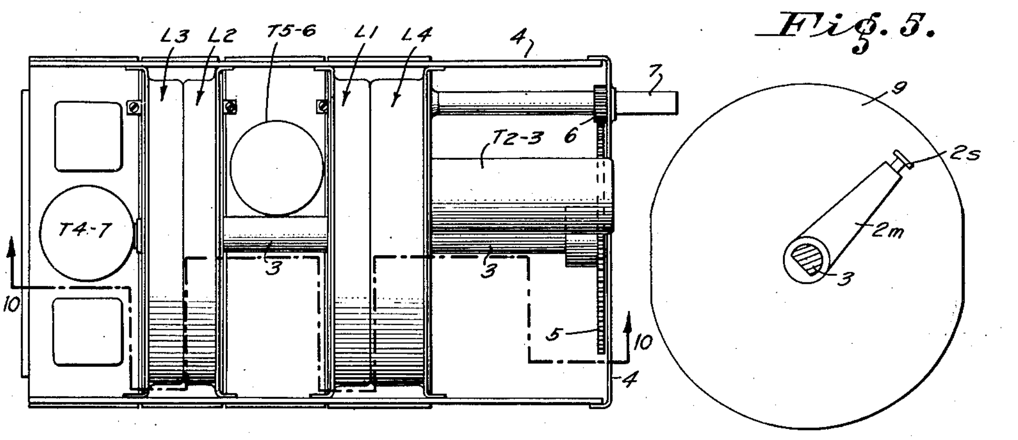
Figure 4 is a plan view of Figure 2.
Figure 5 is a sectional view of Figure 2 taken along the line 5—5 and showing one of the short-circuiting sliders.

A preferred physical embodiment of the tuner-oscillator assembly for operation in the U. H. F. band and television channels is illustrated in Figures 2 to 10. As shown in Figures 2 to 4, the three tuner lines are constructed as individual units and are assembled in axially aligned relation with the oscillator line L4 in a suitable frame or chassis, such as the open-top box 2. A common operating shaft 3 extends through the center of all four line units, the front end of the shaft being journaled in a frame-piece 4 carried by the box 2 and spaced in front of the oscillator line L4. An operating gear 5 is mounted on the forward end of the shaft 3 and is driven by a pinion 6 mounted on a tuning shaft 7 journaled in the frame 4.

Figure 10:
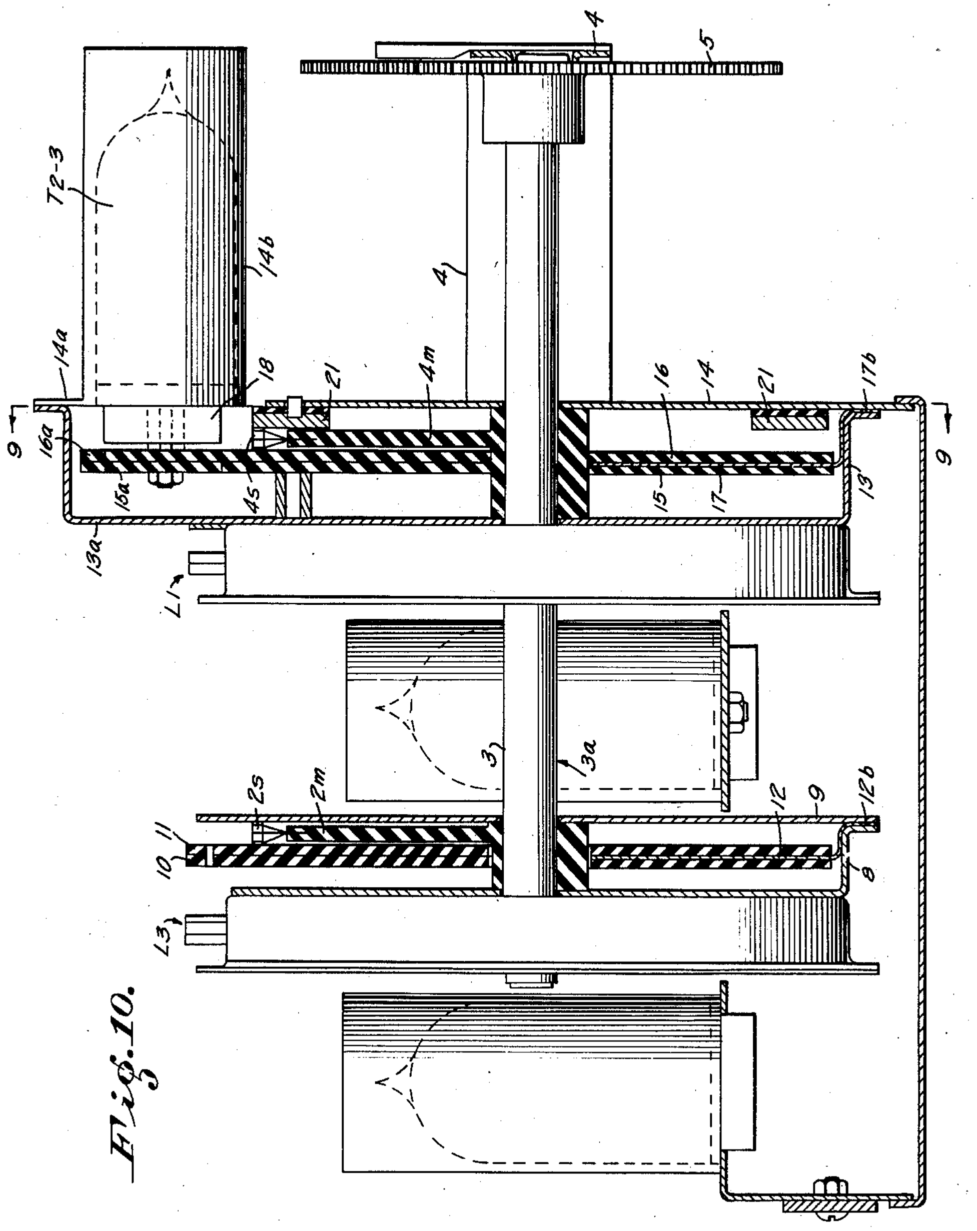
Figure 10 is a sectional view taken along the line 10—10 in Figures 3 and 4 and shown on an enlarged scale.

The two oscillator tubes T2 and T3 are combined in a single tube T2–3 mounted in a socket enclosed within the housing of the line L4, see Figure 10. The two electron tubes T5 and T6 also are embodied in a single tube T5–6, mounted in the space between tuner lines L1 and L2, and tubes T4 and T7 are combined in a single tube T4–7 mounted vertically in the space behind line L3, see Figure 10.

Since the three tuner lines have identical construction, only one will be described. The details of the line L2 are illustrated in Figures 6, 7 and 10, Figure 6 being a rear view of the disc assembly on which the center conductor of the line is formed, Figure 7 being a view of the front face of the same disc assembly, and Figure 10 showing an enlarged sectional view of the disc assembly taken along a cutting plane passing through the axis of shaft 3.

As shown in Figure 10, each tunable line is embodied in a metallic casing or housing which forms the outer conductor or shield for the inner conductor of the line. The shielding housing shown in the drawing comprises a shallow cup-like casing 8 of circular form and having its open end closed by a metallic cover plate 9. The parts 8 and 9 are provided with aligned central openings for receiving the operating shaft 3. The inner conductor of the tunable line is mounted upon an insulating disc-like structure formed of two superposed discs or circular plates 10 and 11 of suitable insulating material, such as polystyrene. A metallic ground plate 12 is interposed between these two plates 10 and 11, and has its outer edge grounded to the cup 8. A part of the inner conductor of line L2 is formed or mounted on the front face of the disc 11, as shown in Figure 7. The remaining parts of line L2 are formed on the rear face of the disc 10, as shown in Figure 6.

The short-circuiting slider 2*s* is interposed between the plate 11 and the cover plate 9 and is carried by the rotary arm 2*m* formed of insulating material and mounted on shaft 3. This shaft is provided with a flattened side 3*a* which serves to maintain the slider arms in alignment. Slider 2*s* provides sliding electrical contact between the inner face of the cover plate 9 and the arcuate portions of the inner conductor of line L2.

Figure 6:
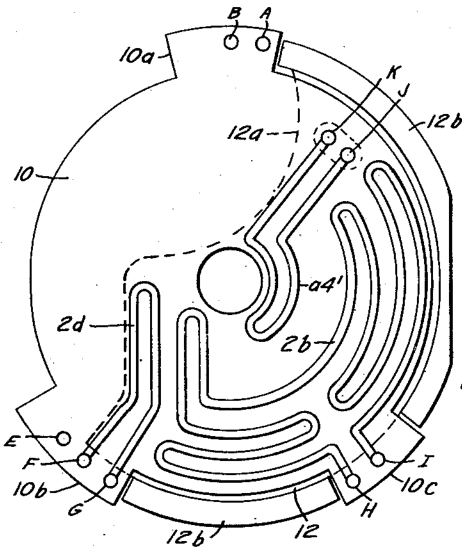
Figure 6 is a sectional view of Figure 2 taken along the line 6—6 and showing the rear face of one tuner disc on which the tuned lines are formed.
Figure 7:
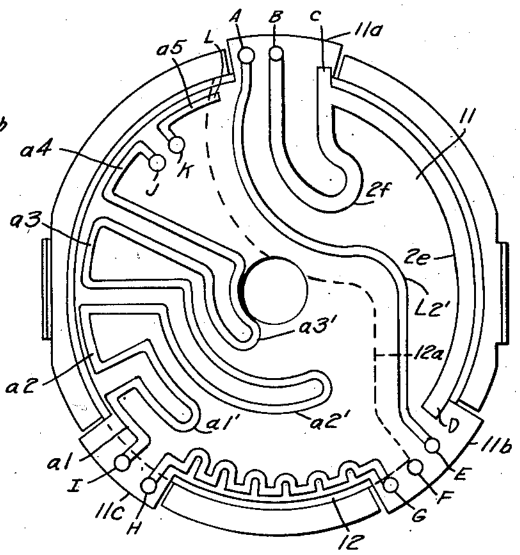
Figure 7 is a sectional view of Figure 2 taken along the line 7—7 and showing the front face of the disc illustrated in Figure 6.

As shown in Figures 6 and 7, insulating discs 10 and 11 are each provided with three radial projections 10*a*, 10*b* and 10*c*, and 11*a*, 11*b*, and 11*c*, respectively, which extend outwardly through spaced openings in the cylindrical wall of the cup-piece 8, and suitable connecting terminals for the line are mounted on these projections. As shown in Figure 7, the high-frequency section of line L2 is mounted on the front face of disc 11, the arcuate section 2*e* of the line being arranged along the path of contact of the slider 2*s* between the points C and D, and the loading section 2*f* being formed as a loop extending inwardly from the path of the slider between the terminal B and the point C. The coupling loop L2′ of the line L2 is carried by the front face of disc 11 and is arranged in inductive relation with conductor sections 2*e* and 2*f* and is connected between terminals A and E.

The loading loop portion 2*d* of the low-frequency section of line L2 is carried on the rear face of disc 10, see Figure 6, and is connected between terminals F and G which pass through projections 10*b* and 11*b* on discs 10 and 11. Line section 2*c* is carried by the front face of disc 11, see Figure 7, and is connected between terminals G and H. Instead of being a continuous circular section engaged by the slider, as shown in Figure 1, this section of the line is formed of 7 arcuate sections connected in series by six loading loops projecting inwardly from the path of the slider and providing the necessary frequency jumps to accommodate television channels 7 to 3. Loading loop section 2*b* is mounted on the rear face of disc 10, see Figure 6, and is connected between terminals H and I passing through projections 10*c* and 11*c*. This loop provides the jump between television channels 7 and 6.

The transmission line section, represented at 2*a* in Figure 1, is formed on the front face of disc 11 between terminal I and the point L. Instead of being formed of a single continuous arcuate section engaged by the slider, this conductor section is formed of five short arcuate sections *a*1 to *a*5 having intervening gaps which are bridged by four loading loops *a*1′ to *a*4′. Three of these loops *a*1′, *a*2′ and *a*3′ are carried on the front face of the disc 11 between terminal I and terminal J, and the fourth loop *a*4′ is carried on the rear face of the disc 10 and is connected between the terminals J and K which pass through both discs and through an opening in the ground plate 12. The four loading loops between terminal I and the point L provide the necessary frequency skipping so that tuning sections *a*1 to *a*5 correspond to television channels 6 to 2, respectively.

As shown in Figures 6 and 7, the ground plate 12 does not extend throughout the entire circular area of the discs 10 and 11, but is limited to the area of the low-frequency section of the line. For this purpose, a portion of the disc 12 is cut away along the irregular line 12*a* running substantially parallel with the coupling loop L2′. Discs 10 and 11 may be only 1/16 inch thick, and ground plate 12 may be less than 10 mils thick. Preferably plate 12 is formed of cup-shape and is provided with an arcuate rim or flange 12*b* which is clamped between the cup 8 and the cover 9. The ground plate effectively shields the line conductor sections carried by disc 10 from the sections carried by disc 11. In addition, because the ground plate is only 1/16 inch away from each line section, the electric field associated with each line section is concentrated directly beneath the section. As a result, it is possible to run adjacent line sections with only a 1/8 inch spacing, and thus avoid appreciable coupling despite the small spacing. In short, the ground plate makes it possible to print 3½ feet of line upon a disc only 3 inches in diameter.

Figure 8:
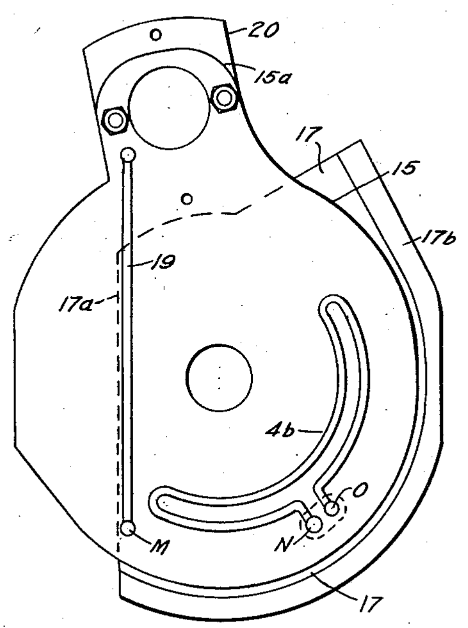
Figure 8 is a sectional view of Figure 2 taken along the line 8—8 and showing the rear view of the oscillator line.
Figure 9:
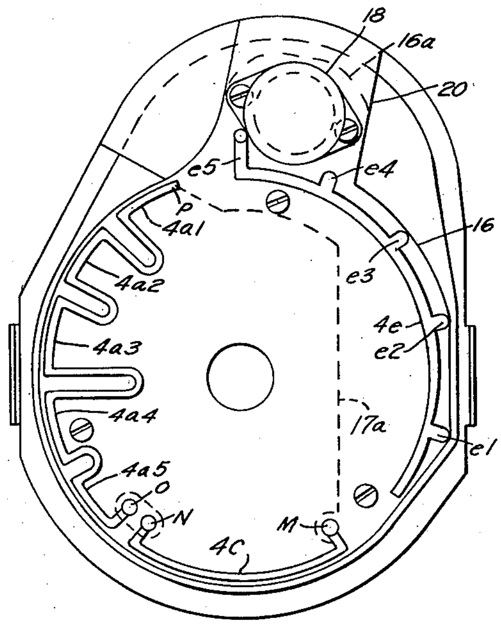
Figure 9 is a sectional view of Figure 2 taken along the line 9—9 and showing the front face of the oscillator line.

The oscillator line L4 is constructed generally in the same manner as the tuner lines, as shown in Figures 8, 9 and 10, but does not include as many loading loops as the tuner lines.

The metallic casing for line L4 is formed of a cuplike piece 13 and a cover plate 14. This casing, instead of being entirely circular in shape, is bulged outwardly at the upper portion as shown at 13*a* and 14*a*, to enclose a socket for the oscillator tube. The line disc assembly is formed of two superposed discs 15 and 16 of insulating material with a metallic ground plate 17 interposed between these discs and having its outer peripheral edge grounded to a cup piece 13. The discs 15 and 16 are provided with projections 15*a* and 16*a* for supporting the socket 18 for the oscillator tube T2–3, the socket 18 being supported within the casing 13 in registry with an opening in cover plate 14. A metallic shield 14*b*, supported on the plate 14, surrounds the tube T2–3.

The high-frequency section 4*e* of the oscillator line is formed or supported on the front face of disc 16 as shown in Figure 9, and the upper end of this line section is connected to the socket contact for the anode of oscillator tube T2. The oscillator line does not contain a loading loop corresponding to loop 2*f* of line L2. Section 4*e* of line L4 is provided with a number of laterally extending lug portions *e*1, *e*2, *e*3, *e*4, etc., arranged opposite the ends of trimmer screws *s*1, *s*2, *s*3, *s*4, etc., threaded through the cover plate 14, see Figure 3. These lugs and screws constitute trimmer condensers for securing proper tracking of the oscillator.

The low-frequency section of the oscillator line is formed of six spaced arcuate sections arranged between terminal M and the point P. A loading loop 4*b* is incorporated in this line section and is connected between terminals N and O which pass through discs 15 and 16 and through an opening in the ground plate 17, the loop 4*b* being supported upon the rear face of disc 15 as shown in Figure 8. The arcuate section of the line connected between terminals M and N tunes the oscillator over the range covering television channels 7 to 13.

The line section extending from terminals O to the point P is divided into five arcuate sections 4*a*1 to 4*a*5, and these sections are connected in series by four loading loops carried on the front face of disc 16 as shown in Figure 9. These five arcuate sections tune the oscillator for television channels 2 to 6, respectively.

As in the case of the tuner lines L1 to L3, the ground plate in the oscillator line does not extend over the entire area of the disc assembly for this line, but it is cut away along an irregular line 17*a* so that it covers only the area occupied by the low-frequency section of the line.

Terminal M connected to the high-frequency end of the low-frequency section of the oscillator line is connected by conductor 19 to the socket contact for the anode of oscillator tube T3, the connection 19 being mounted on the rear face of disc 15. A thin metallic grounding plate 20 extends from the tube socket 18 and is clamped between the rim of the cup-piece 13 and the cover plate 14, to provide a ground connection for parts of the tube circuit which require grounding.

For the purpose of providing for the selective application of anode potential to the two oscillator tubes by the slider contact of the oscillator line, a circular metallic ring 21 is mounted upon the inner face of cover plate 14 but insulated therefrom, and this ring forms a trackway for the slider 4*s*. The anode potential for the two oscillator tubes is applied to the insulated ring 21 through the circuit connections shown in Figure 1. It will be understood that the slider 4*s*, carried by arm 4*m* of insulating material, establishes a sliding contact between the ring 21 and the arcuate sections of the oscillator line shown in Figure 9, and thus applies anode potential to one or the other of the two oscillator line sections. Ring 21 corresponds to trackway L12 of Figure 1.

The various inner-conductor line sections carried by disc-assemblies may be formed in different ways. For example, they may be stamped from thin sheet metal of high conductivity and cemented or otherwise bonded to the faces of the supporting discs. It is preferred, however, to form these line sections directly on the supporting discs by any of the techniques employed in making "printed" circuits. It will be understood that the two insulating discs and the ground plate embodied in each line are secured together by suitable screws or other means to form a unitary assembly.

It is believed that the operation of the invention will be clear from the foregoing without any additional description. It will be understood that each of the two sections forming each tuned line operates essentially in the same manner as a quarter-wave length section of a coaxial cable the resonant frequency of which is varied by moving a short-circuiting slider along its length. It will also be observed that since the two quarter-wave sections are arranged in axial alignment, one slider is used on both quarter-wave sections.

Where tuned lines are constructed in circular form as illustrated in Figures 2 to 10, it is preferred to arrange the ground plate on the inside of the arcuate line sections, because of the saving in space. However, where the saving of space is not the controlling factor, the ground plate may surround the arcuate conductor sections, in which case the loading loops would extend outward on opposite sides of the plate.

I claim:

1. A tuner for short radio waves comprising a plurality of transmission lines each having a short-circuiting slider for varying the length thereof, means connecting said sliders for ganged operation over a predetermined tuning range, the transmission conductors of said lines being divided into two linear sections comprising a low-frequency section and a high-frequency sections insulated from said low-frequency section, means connecting said high-frequency sections in cascade in one receiving channel, means connecting said low-frequency sections in cascade in a second receiving channel independently of said first channel, each of said channels including a translating device having a normally open circuit for disabling the channels, and connections for selectively completing said normally open circuits through said line conductor sections by way of one of said short-circuiting sliders.

2. A tuner according to claim 1 wherein the translating device in the high-frequency channel comprises a crystal detector having its direct current path completed through the high-frequency conductor section of one of said lines.

3. A tuner according to claim 1 wherein the translating device included in the low-frequency channel comprises an electronic tube amplifier having its anode current path completed through the low-frequency conductor section of one of said transmission lines.

4. A tuner for short radio waves comprising a pair of shielded transmission lines arranged in alignment with a small gap between adjacent ends of the conductors of said lines, said transmission conductors being insulated from each other, means for applying received waves to each of said lines, a single short-circuiting slider movable throughout the extent of both of said lines for selectively tuning one or the other of said lines to the received waves, a common output circuit, separate detector circuits connecting said lines to said output circuit, one of said detector circuits including a normally open circuit for direct current, and means for completing said normally open circuit through the short-circuiting slider associated with said one detector circuit.

5. A receiver for short radio waves comprising a shielded transmission line having a short-circuiting slider movable throughout the length thereof, the transmission conductor of said line being divided into two linear sections comprising a low-frequency section and a high-frequency section, means for applying received waves to each of said conductor sections, an output circuit, detector circuits connecting said conductor sections to said output circuit, a second shielded transmission line having a short-circuiting slider movable throughout the length thereof and having its transmission conductor divided into two linear sections comprising a low-frequency section and a high-frequency section, means connecting said sliders for ganged operation, an electronic tube connected to the high-frequency conductor section of said second transmission line and producing oscillations of a frequency determined by the length of the high-frequency conductor section of the second line, a second electronic tube connected with the low-frequency conductor section of the second line and producing oscillations of a frequency determined by the length of the connected low-frequency conductor section, connections for supplying oscillations from said electronic tubes to the respective detector circuits, and connections for selectively supplying anode current to said electronic tubes through the short-circuiting slider of said second transmission line.

6. A receiver according to claim 5 wherein the anodes of said tubes are conductively connected to the two conductor sections of the second transmission line, and the short-circuiting slider of said second line slides on an insulated trackway connected to the positive side of the source of anode current.

7. An oscillation generator for generating oscillations within a band of frequencies comprising a shielded transmission line having a short-circuiting slider movable throughout the length thereof and having its transmission conductor divided into two linear sections comprising a low-frequency section and a high-frequency section, an electronic tube connected to the high-frequency conductor section of said transmission line and producing oscillations of a frequency determined by the length of the high-frequency section, a second electronic tube connected with the low-frequency conductor section of said transmission line and producing oscillations of a frequency determined by the length of said low-frequency conductor section, and connections for selectively supplying anode current to said electronic tubes through the short-circuiting slider of said transmission line.

8. A tuner for short radio waves comprising a plurality of shielded transmission lines each having a short-circuiting slider for varying the length thereof, means connecting said sliders for ganged operation over a predetermined tuning range, the transmission conductor of each of said lines having a gap formed therein for dividing the conductor into two linear sections comprising a low-frequency section and a high-frequency section insulated from said low-frequency section, means connecting said high-frequency sections in cascade in one receiving channel, means including an electron tube amplifier circuit connecting said low-frequency sections in cascade in a second receiving channel independently of said first channel, and means embodied in said amplifier circuit for effecting transmission of energy over said second channel at high gain over two spaced frequency sub-bands and at a substantially lower gain in the intermediate sub-band.

9. A tuner according to claim 8 wherein said amplifier circuit includes an interstage coupling network formed of a condenser and an inductance connected in parallel combination and an inductance connected in series with said combination, said parallel combination being tuned to present high impedance to frequencies in said intermediate sub-band.

10. A tuner according to claim 8, and including means for supplying space current to at least one tube of said amplifier through the sliding contact of one of said shielded lines and through a variable portion of the low-frequency conductor section of said one line.

11. A tuner for short radio waves comprising a shielded transmission line having a short-circuiting slider for varying the length thereof, the transmission conductor of said line having a gap formed therein for dividing the conductor into two linear sections comprising a low-frequency section and a high-frequency section insulated from said low-frequency section, means connecting said high-frequency section in one receiving channel, means connecting said low-frequency section in a second receiving channel independently of said first channel, said low-frequency conductor section having a plurality of short gaps formed therein at spaced points along its length, a grounded shield plate positioned alongside said low-frequency conductor section, and a conductor loop bridging each gap in said low-frequency conductor section, at least two of said loops being arranged on opposite sides of said shield plate.

References Cited in the file of this patent

UNITED STATES PATENTS

| | | |
|---|---|---|
| 2,474,978 | Holland | July 5, 1949 |
| 2,505,251 | Knol | Apr. 25, 1950 |
| 2,513,392 | Aust | July 4, 1950 |
| 2,513,393 | Frey | July 4, 1950 |
| 2,516,272 | Thompson | July 25, 1950 |
| 2,516,990 | Herold | Aug. 1, 1950 |
| 2,537,052 | Haeff | Jan. 9, 1951 |
| 2,551,228 | Achenbach | May 1, 1951 |
| 2,573,045 | Murphy | Oct. 30, 1951 |
| 2,573,517 | Van Weel | Oct. 30, 1951 |
| 2,575,702 | Baker | Nov. 20, 1951 |
| 2,627,579 | Wasmansdorff | Feb. 3, 1953 |
| 2,631,241 | Schmidt | Mar. 10, 1953 |